United States Patent [19]
Hill

[11] Patent Number: 5,303,756
[45] Date of Patent: Apr. 19, 1994

[54] TIRE FOR INDICATING TREAD WEAR AND METHOD OF MANUFACTURING THE SAME

[76] Inventor: James L. Hill, 301 Standiford Ave., Apt. 144, Modesto, Calif. 95350

[21] Appl. No.: 767,375

[22] Filed: Sep. 30, 1991

[51] Int. Cl.$^5$ ............................................. B60C 19/00
[52] U.S. Cl. ................................ 152/154.2; 152/197; 156/110.1
[58] Field of Search ............... 152/154.2, 209 R, 210, 152/169, 196, 197; 116/208

[56] References Cited

U.S. PATENT DOCUMENTS

| | | |
|---|---|---|
| 1,422,290 | 7/1922 | Moriarty ........................ 152/169 |
| 2,102,784 | 12/1937 | Bridges . |
| 3,261,388 | 7/1966 | Kovac et al. . |
| 3,362,376 | 1/1968 | Norton . |
| 3,516,467 | 6/1970 | Sims . |
| 3,578,055 | 5/1991 | French et al. . |
| 3,653,422 | 4/1972 | French . |
| 3,814,160 | 6/1974 | Creasey . |
| 3,833,040 | 9/1974 | Bins . |
| 3,929,179 | 12/1975 | Hines ........................ 152/154.2 |
| 4,074,742 | 2/1978 | Chamblin . |
| 4,226,274 | 10/1980 | Awaya et al. . |

FOREIGN PATENT DOCUMENTS

| | | |
|---|---|---|
| 2457334 | 6/1975 | Fed. Rep. of Germany ... 152/154.2 |
| 1294744 | 4/1962 | France ........................ 152/154.2 |

Primary Examiner—Michael W. Ball
Assistant Examiner—Nancy T. Krawczyk
Attorney, Agent, or Firm—Flehr, Hohbach, Test, Albritton & Herbert

[57] ABSTRACT

A belted tire including carcass, which is formed by a plurality of body plies, and tread rubber vulcanized to the plies. A plurality of circumferentially spaced apart wear indicating members are secured to the tire carcass, preferably between two plies, but optionally to any single ply. The wear indicating members extend radially outward from the carcass to a desired wear-indicating position, which may be beyond the base of adjacent tire grooves or at other radial levels. The wear indicating member includes a housing assembly containing a visually distinctive material which is visually perceptible from the color of the tire tread. The housing assembly thermally insulates the visually distinctive material sufficiently during vulcanization of the tire to prevent thermal degradation of the wear-indicating material. Optionally, the housings can be solid metallic pins which also provide a shiny visually perceptible wear-indicating material. As the tread rubber wears down, the visually distinctive wear-indicating material is exposed.

21 Claims, 2 Drawing Sheets

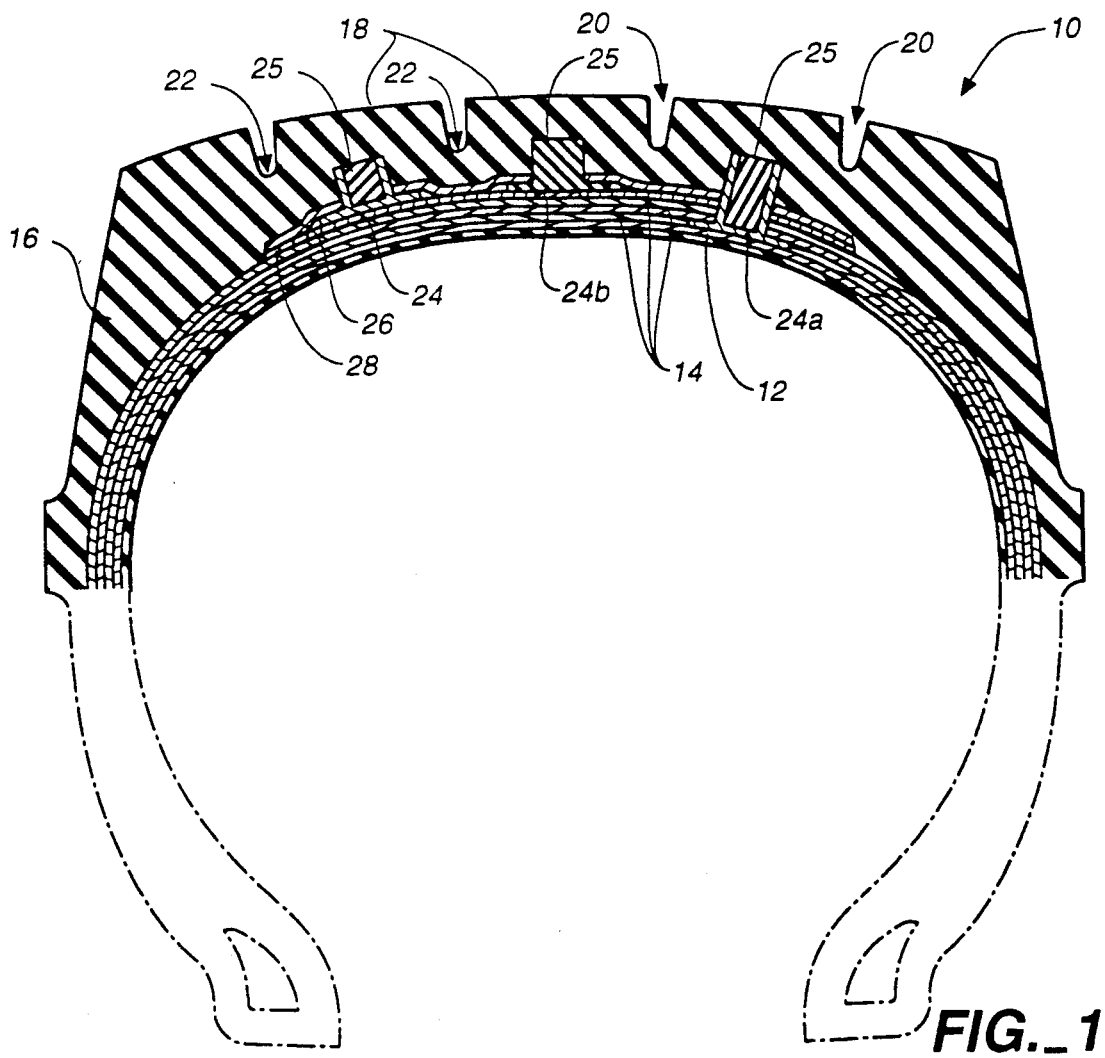
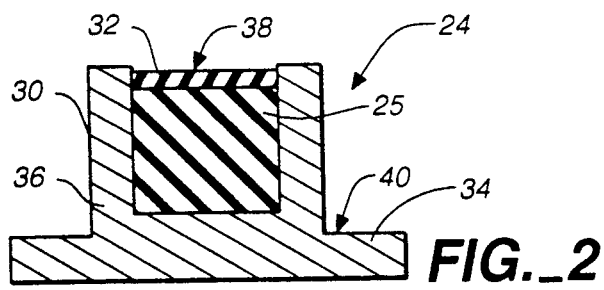
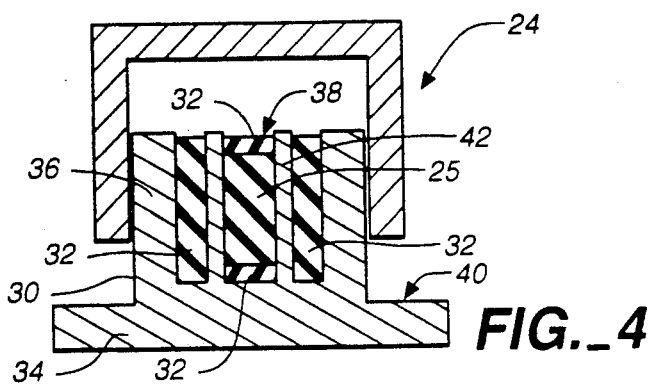
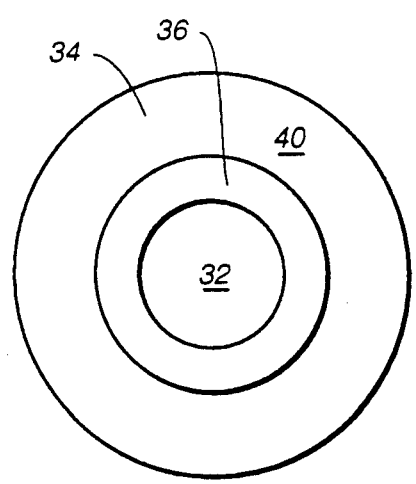

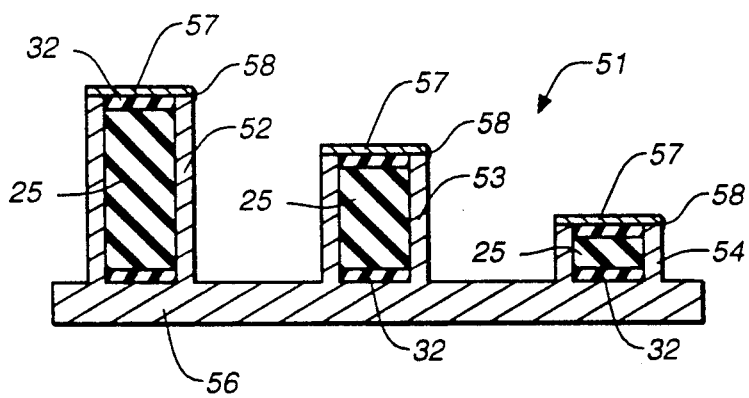
FIG._5
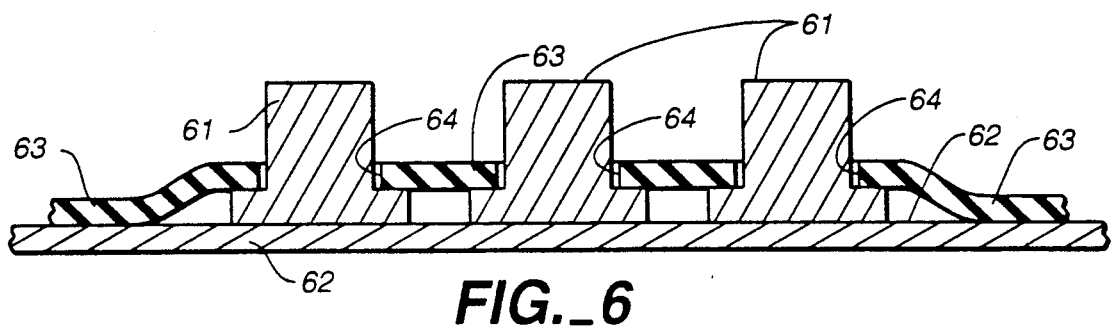
FIG._6
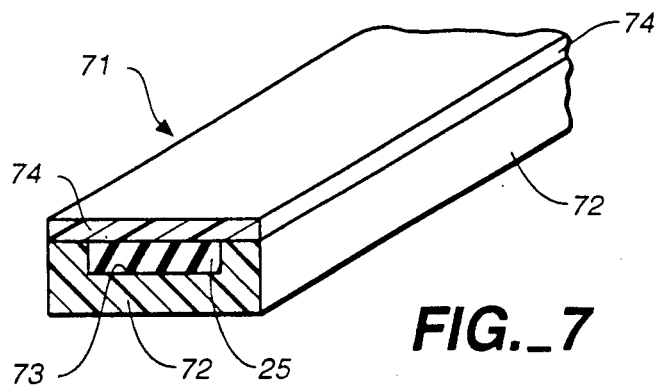
FIG._7
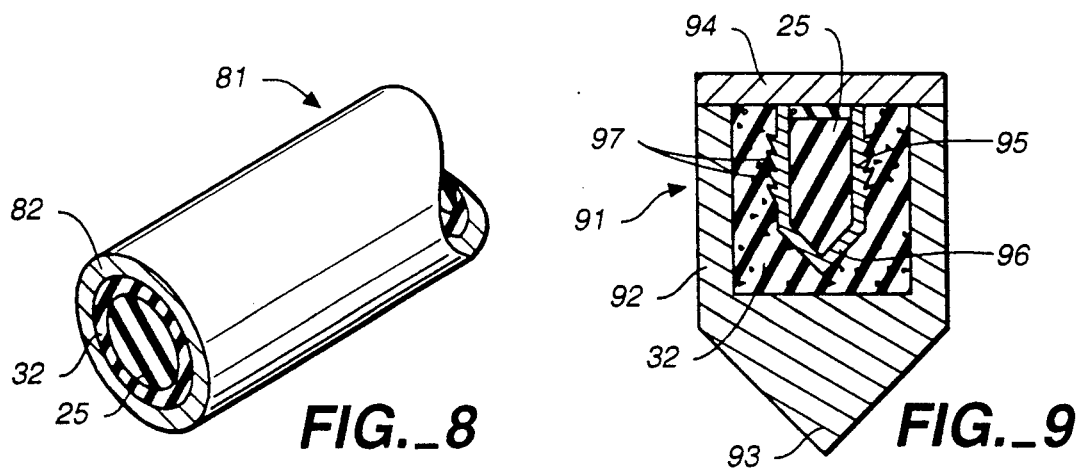
FIG._8
FIG._9

TIRE FOR INDICATING TREAD WEAR AND METHOD OF MANUFACTURING THE SAME

FIELD OF THE INVENTION

This invention relates to vehicle tires which indicate tread wear and methods of manufacturing the same. More specifically, this invention relates to pneumatic tires including colored tread wear indicators to visually indicate when the tire has been worn to an unsafe limit.

BACKGROUND

Pneumatic vehicle tires essentially consist of a tire carcass, which consists of plies of rubberized fabric, and tread rubber, which surrounds the exterior surface of the carcass. In belted tires, additional layers of fiber glass, steel, or aramid are placed between the plies and the tread rubber. During manufacture, the tire is vulcanized to gain its final shape and strength characteristics. Beside equalizing the stresses within the tire body, the vulcanization changes the rubber compound into a tough, highly elastic material and bonds the parts of the tire into one integral unit.

During the vulcanization process, the tread rubber is molded to form the tire treads which provide frictional engagement between the tire and the road surface. The treads also protect the tire carcass from foreign obstacles on the road surface which could damage the carcass. Since the effectiveness of the tire tread as a cushioning and protective sheath is dependent upon the amount of tread rubber covering the carcass, this effectiveness is decreased as the treads are reduced by wear. If the tire is not routinely inspected, the tread may be worn down to a level where driving becomes dangerous.

In the past, it has been known to form a tire with a layer of a colored material embedded in the tread rubber to visually indicate the degree of tread wear. For example, U.S. Pat. No. 3,261,388 discloses positioning plies having colored fibers at different tread depths to visually indicate when the tread has been worn to the point at which the tread should be recapped or the tire replaced. U.S. Pat. No. 3,516,467 discloses a tire having a sub-surface tread portion of a color contrasting to the outer portion of the tread to indicate when the tread is worn. U.S. pat. No. 3,516,467 suggests embedding a colored indicating means within the tread portion of a tire. In this case, the indicating means is preferably made from rubber, metal, or plastic. It has also been recognized in the past to incorporate a colored material directly within the tire treads to visually monitor the amount of tread wear, as shown in U.S. Pat. Nos. 2,102,784 and 4,226,274.

Problems have arisen in connection with the abovedescribed colored tread wear indicators in that the coloring in the indicators degrades under the high temperature of vulcanization. Moreover, in instances when the colored material is formed from plastic, the colored material may not sufficiently adhere to the tread rubber. Consequently, after the tire cools following vulcanization, air pockets may remain between the plastic tread wear indicators and the tread rubber, thereby reducing the integrity of the tire.

Another method of visually indicating tread wear involves positioning colored tread markers in the grooves of a tire, as disclosed in U.S. Pat. No. 3,578,055. Shoulder portions are cut or molded into the base of the grooves for receiving the colored markers, which are preferably made from a plastic material.

U.S. Pat. No. 3,653,422 discloses a tire having a traction pattern incorporated in the tread rubber. The pattern only becomes visible when a predetermined amount of the tread rubber remains, thus warning the user that the tire will soon have to be replaced or retreaded. U.S. Pat. Nos. 4,074,742, 3,833,040 and 3,362,376 disclose other tire tread wear indicating systems.

The difficulties suggested in the preceding art are not intended to be exhaustive but rather are among many which tend to reduce the effectiveness of prior tires having colored tread wear indicators. Other noteworthy problems may also exist; however, those presented above should be sufficient to demonstrate that such tires for indicating tread wear appearing in the past will admit to worthwhile improvement.

Accordingly, it is therefore a general object of the invention to provide a belted tire which will obviate or minimize difficulties of the type previously described.

It is a specific object of the invention to provide a belted tire which visually indicates the degree of tread wear to warn a user when the tread has been worn to an unsafe limit.

It is another object of the invention to provide a pneumatic or solid belted tire which includes a colored and/or fluorescent and/or solid tread wear indicator structurally designed to maintain its coloring, fluorescence and integrity under the high temperatures of vulcanization.

It is still another object of the invention to provide a tread wear indicator for use with a belted tire which is durable, compact, and economical to manufacture.

It is a further object of the invention to provide a method for forming a tire which visually indicates when the tread has been worn to an unsafe limit.

DISCLOSURE OF THE INVENTION

A preferred embodiment of the invention which is intended to accomplish at least some of the foregoing objects includes a belted tire generally comprising a carcass, which is formed by a plurality of body plies, and tread rubber vulcanized to the plies. The tread rubber is molded to form a plurality of spaced apart treads defined by grooves therebetween. Each of the grooves extends radially inward to a base.

A plurality of circumferentially spaced apart wear indicating members are secured to the tire carcass, preferably between the two outermost plies. The wear indicating members extend radially outward from the carcass to a position beyond the base of adjacent grooves. Each wear indicating member includes a housing assembly containing a material which is visually distinct from the color of the tire tread. The housing assembly thermally insulates the material sufficiently during vulcanization of the tire to prevent thermal degradation of the material. As the tread rubber wears down, the visually distinct material is exposed and indicates tread wear.

A method for forming a belted tire in accordance with a preferred embodiment of the invention includes securing a plurality of wear indicating assemblies to the carcass of the belted tire at a predetermined level in the tire to indicate tire wear. The tread rubber is then vulcanized to the carcass and, simultaneously, the tread rubber is molded to form the tread design in the tread rubber.

DISCLOSURE OF INVENTION

The wear indicating assemblies of the present invention are employed with belted usually pneumatic tires having a carcass formed by a plurality of body plies or belts. Tread rubber is vulcanized to the plies and molded to form treads, usually spaced apart by grooves. The present invention comprises, briefly, a plurality of wear indicating members or assemblies each secured to the carcass and each extending radially outward to a desired wear-indicating position in the tire body. The wear indicating members have a housing containing a visually distinct material which can be readily visually perceived against the color of the tread rubber. The housing assembly provides thermal insulation preventing degradation of the visually distinct material during tire vulcanization. The visually distinct material may be a colored material, reflective material, fluorescent material or shiny solid metal material.

BRIEF DESCRIPTION OF THE DRAWINGS

Other objects and advantages of the present invention will become apparent from the following detailed description of a preferred embodiment thereof taken in conjunction with the accompanying drawings, wherein:

FIG. 1 is a cross-sectional view of a belted tire constructed in accordance with a one embodiment of the present invention;

FIG. 2 is a enlarged view, in cross section, of a wear indicating member constructed in accordance with the subject invention;

FIG. 3 is a top plan view of the wear indicating member shown in FIG. 2; and

FIG. 4 is an enlarged view, in cross section, of an alternative embodiment of a wear indicating member constructed in accordance with the invention.

FIG. 5 is an enlarged, side elevation view, in cross section, of an alternative embodiment of a wear indicating assembly constructed in accordance with the present invention.

FIG. 6 is an enlarged, side elevation view, in cross section, of a further alternative embodiment of a wear indicating assembly of the present invention.

FIG. 7 is an enlarged, fragmentary, top perspective view of still a further alternative wear indicating member constructed in accordance with the present invention.

FIG. 8 is an enlarged, fragmentary top perspective view of another alternative embodiment of wear indicating member of the present invention.

FIG. 9 is an enlarged, side elevation view, in cross section, of still a further alternative embodiment of the wear indicating assembly of the present invention.

BEST MODE OF CARRYING OUT THE INVENTION

Referring now to the drawings, wherein like numerals indicate like parts, and initially to FIG. 1, there will be seen a pneumatic belted tire, generally indicated 10, including a carcass 12, which is formed by a plurality of body plies 14, and tread rubber 16 vulcanized to carcass 12. Tread rubber 16 is molded to form a plurality of spaced apart land portions 18 defined by 5 grooves 20 which extend between adjacent land portions 18. Each of grooves 20 extends radially inward toward plies 14 to a base 22.

A plurality of tread wear indicating members 24 are shown secured to the outermost belts 26 and 28 of the tire carcass 12. It will be understood, however, that wear indicating members 24 can be secured to any belt or ply of the tire including being mounted inwardly of the innermost ply and outwardly of the outermost belt. Tread wear indicating members 24 contain a visually distinct material 25 which can be readily visually perceived against the tire, i.e., a material having a reflectance, color, fluorescence or texture which differs from the color of tread rubber 16. Three preferred types of visually distinct materials 25 are contemplated for use in the present invention, namely, colored materials, fluorescent materials, reflective materials, and solid metallic housings that are essentially pins (such as 24b) and provide shiny surfaces that are visually distinct from the tire tread. As the tire tread wears down, visually distinct material 25 is exposed to indicate that the tread needs recapped or repaired or, alternatively, the tire replaced.

In a preferred embodiment, tread wear indicating members 24 are secured between the two outermost plies 26 and 28; however, members 24 may be secured to inner plies, such as is illustrated by member 24a, or positioned on top of ply 26. Double-sided tape, or any suitable adhesive composition, can be used to secure members 24 during vulcanization of the tire. Members 24 are preferably uniformly spaced around the circumference of tire 10 are radially aligned with land portions 18. It will be understood, however, that non-uniform and/or nonaligned locations can be employed within the scope of the present invention.

Each member 24 normally will extend radially outward from outermost ply 26 to a position beyond the base 22 of the grooves 20 adjacent member 24. This ensures that the colored material of tread wear indicating members 24 will be exposed before the tire is bald or is worn beyond safe limits. In racing applications, however, tread wear down to a bald or even belt-exposed condition may be acceptable, and wear indicators 24 may not extend radially beyond outer belt 26. Additionally, members 24 may bee positioned to extend further into respective land portions 18 to provide a means for gradually monitoring tread wear. In addition, material 25 may be visually different colors, etc., at different levels of members 24 to more accurately indicate the degree of tread wear.

In FIG. 1, three tread wear indicating members 24, 24a and 24b are shown positioned at various levels in the tire and in radial alignment with the three central land portions; however, it is to be understood that members 24, 24a and 24b may be secured at any position along the width of tire 10. For example, positioning the tread wear indicating members in alignment with the outermost land portions will permit a user to visually detect if tire 10 is being unevenly worn.

Turning to FIG. 2, there will be seen a tread wear indicator member 24 including a metallic housing assembly 30 which contains colored or other visually distinctive material 25 and an insulative material 32. Insulative material 32 advantageously may be composed of aerogel, fiberglass, or any one of a number of insulating materials which will reduce heat transfer to material 25 and yet bond to or not degrade the strength of the rubber during vulcanization. Rubber and synthetic rubber are particularly useful as insulating members 32. Alternatively, member 32 can also be a metal disc or cap, which is secured to housing 30, for example, by welding, adhesives, or friction, and which provides some insulation and yet wears off to expose material 25.

The insulative material 32 serves to isolate visually distinct material 25 from the high temperatures of the vulcanization process. The metallic properties of housing assembly 30 serve to provide mechanical strength and serve as a heat sink to further insulate material 25 from the high vulcanization temperatures. Metallic belts are well known to be compatible with vulcanized rubber, and accordingly metallic housings 30 will not degrade or diminish tire strength.

Housing assembly 30 has a base 34 and a sidewall 36 terminating in an open end 38. In a preferred embodiment, base 34 is circular in shape, and sidewall 36 is formed in a cylindrical shape, as shown in FIG. 3. Base 34 has a diameter greater than the diameter of sidewall 36 to form a rim 40 for securing housing assembly 30 to or between plies, such as between plies 26 and 28 or other plies. Sidewall 36 is preferably of a height so that, when housing assembly 30 is secured to a ply, sidewall 36 extends radially outward to the desired wear indicating position, for example to a position proximate or beyond base 22 of adjacent grooves. Housing assembly 30 is preferably composed of steel, but may be formed from other suitable metallic materials, and it may take the form of a solid pin, such as pin 24b.

Insulative material 32 is disposed across open end 38 of housing assembly 30 to encapsulate visually distinct material 25 within housing assembly 30. As the respective land portion wears down, the layer of insulative material 32 is worn away to expose material 25. Sidewall 36 may also be worn down from contacting the road surface. To reduce heat degradation an insulative material also can be intermixed with material 25.

FIG. 4 shows an alternative embodiment of the subject invention. Housing assembly 30 includes an inner wall 42 spaced from sidewall 36. Material 25 is contained within inner wall 42. Insulative material 32 is disposed between inner wall 42 and sidewall 36 to further insulate visually distinct material 25. Insulative material 32 is also located between wear-indicating material 25 and base 40, as well as across open end 38 of inner wall 42. The thickness of material 34 can be varied to accommodate various vulcanizing temperatures and thermal sensitivities of material 25. In this embodiment, any heat transfer occurring through housing member 30 during vulcanization must follow a circuitous path through assembly 30 to reach material 25.

The alternative embodiments of FIGS. 5–9 illustrate further constructions of the tire tread wear-indicating assembly of the present invention. In FIG. 5, wear indicating assembly 51 is comprised of three housings 52–54 of differing height or radial dimension which are joined together by common base 56. Disposed in each housing 52–54 is a visually distinct material 25, and the housings can include insulative layers 32, as well as a solid end cap 57 which are track-welded, brazed or adhesively secured at 58 to metal housing bodies 52–54.

The form of the present invention shown in FIG. 5 facilitates handling during attachment to the tire carcass by connecting housings 52–54 together by common base 56. Additionally, the varying height or radial dimensions results in the wear indicating material being exposed at different degrees of tire wear. To this end it is advantageous if material 25 is a different color in each of housings 52, 53 and 54. Thus, green, yellow and red dyed materials can advantageously be used.

Turning to FIG. 6, a plurality of individual solid pins 61 are shown mounted to ply 62 of a tire carcass by a common securement strip 63 which extends transversely across the tire. Again, use of a single strip with multiple openings 64 therein simplifies mounting of the wear indicating members to the tire carcass.

FIG. 7 illustrates an alternative embodiment of the present invention in which wear indicating assembly 71 is formed as a strip-like housing 72 having a longitudinally extending cavity 73 in which visually distinctive material 25 can be retained. A covering layer 74 completes the assembly.

Wear strip 71 can be mounted to tire carcass to extend circumferentially around the tire or transversely and it can have various radial heights so as to enable wear indicating material 25 to be exposed at the desired degree of wear. In the form shown in FIG. 7, strip body 72 and cover 74 are formed of a non-metallic material which is compatible with tread rubber, such as fiberglass.

In a manner similar to FIG. 7, the wear indicating assembly 81 of FIG. 8 is an elongated housing, in this case a metal wire-like body 82 having a concentric insulating layer 32 therein and visually distinct material 25 at the core of the assembly. Wires as constructed in FIG. 8 can optionally omit insulation layer 32, and they can be employed either above a standard carcass ply or woven into the carcass plies.

They also can extend circumferentially, transversely or diagonally in the tire.

Finally, wear indicating assembly 91 of FIG. 9 illustrates a form of the invention which can be driven into a tire after vulcanization or driven into the carcass before vulcanization. Housing body 92 is formed with a pointed end 93 and a cap 94 on the opposite end. Mounted inside housing 92 is an insulting material 32 and an insert or second housing 95 which contains visually distinctive material 25. Insert 95 can also have a pointed end 96 and ribs 97 which allow the insert to be pushed into insulting material 32 during assembly. Ribs 97 resist backing out of insert 95 from the insulating material.

It should be noted that ribs 97 could also be provided on the outside of housing 91 to resist backing out of housing 91 from the tire tread rubber and/or carcass. It also should be noted that insulating material 32 can be formed as a visually distinctive material so as to act as a wear indicator.

A method for forming a belted tire of the subject invention includes securing tread wear indicating members 24 to the tire carcass 12, preferably to one of the plies. The tread rubber is then vulcanized to carcass 12 and, simultaneously, the tread rubber is molded to form the tread design in the tread rubber. Tread wear indicating members 24 are positioned relative to the tire carcass so that, when the tread rubber is molded, respective sidewalls 36 of members 24 are positioned transversely and circumferentially in the desired positions relative to land portions 18 grooves 20. It is to be understood that more than one member 24, 24a, 24b may be positioned on carcass 12 per land portion.

Alternatively, tire tread wear indicating assemblies can be forced into a formed or vulcanized tire. Thus, an assembly can be formed without side lip 40 (e.g., FIG. 9) and the metal casing or solid pin used to provide sufficient mechanical strength to drive the wear indicating assembly, such as assembly 91, into land portions 18, for example, by using a tool or even a small explosive charge, as is done with nail guns. The tire belts will prevent driving the wear indicator in too far and will result in proper depth positioning of the indicators. The resilient rubber of the land portion will close behind the wear indicator assembly once it is properly positioned.

Since colored, or fluorescent or shiny metallic materials 25 of tread wear indicating members 24 may be clearly seen while tire 10 is in motion, this assembly could be employed to aid highway patrolmen in identifying motor vehicles travelling on potentially dangerous tires. The tread wear indicators 24 could also serve as a tire inspection monitoring device for trucks, which frequently experience tire blowouts on highways.

Material 25 advantageously is fluorescent and, in fact, fluorescent materials seem to resist thermal degradation better than standard, colored, non-fluorescent dyes.

In describing the invention, reference has been made to a preferred embodiment and illustrative advantages of the invention. Those skilled in the art, however, and familiar with the instant disclosure of the subject invention, will recognize additions, deletions, modifications, substitutions, and other changes which will fall within the purview of the subject invention and claims.

What is claimed is:

1. In a tire including a body formed by a plurality of body plies, and tire rubber vulcanized to said plies and molded to form a plurality of spaced apart land portions defined by grooves therebetween, the improvement comprising:
a plurality of circumferentially spaced apart wear indicating members each mounted in said tire rubber and secured to one of said body plies and each extending radially outward in said tire rubber to a desired wear-indicating position inwardly of an exterior surface of said tire, said wear indicating members each having a housing assembly formed of a housing material, and each housing assembly containing a visually distinctive material other than said housing material, said visually distinctive material being visually perceptible from the color of said tire rubber, and said housing assembly thermally insulating said visually distinctive material sufficiently during vulcanization of said tire to prevent thermal degradation of said visually distinctive material, so that, as said tread rubber wears down, said visually distinctive material is exposed and indicates tread wear.

2. A tire as defined in claim 1 wherein:
said housing assembly contains insulative material intermixed with said visually distinctive material.

3. A tire as defined in claim 1 wherein:
said housing assembly includes a base and a sidewall terminating in a open end, and
insulative material is disposed across said open end to encapsulate said visually distinctive material within said housing assembly.

4. A tire as defined in claim 3 wherein:
said wear indicating members each include a cap member dimensioned for placement over said housing assembly in slidable engagement with said sidewall.

5. A tire as defined in claim 1 wherein,
said visually distinctive material is provided by a solid metallic pin.

6. The tire as defined in claim 1 wherein,
a plurality of wear indicating members are secured together by a common base means.

7. The tire as defined in claim 6 wherein,
said wear indicating members have differing height dimensions from said common base.

8. The tire as defined in claim 1 wherein,
a plurality of said wear indicating members are secured to said carcass by a common securement strip.

9. The tire as defined in claim 1 wherein,
said housing assembly is an elongated strip-like member having an elongated cavity receiving said visually distinctive material therein.

10. The tire as defined in claim 1 wherein,
said housing is an elongated wire-like housing having said visually distinctive material as a core thereof.

11. The tire as defined in claim 10 wherein,
a thermally insulative material is provided between said housing assembly and the core of visually distinctive material.

12. The tire as defined in claim 1 wherein,
said housing assembly has a pointed end and is suitable for driving into vulcanized rubber tire rubber.

13. The tire as defined in claim 1 wherein,
said visually distinctive material is contained in a ribbed insert mounted in said housing assembly.

14. A tire for indicating tread wear comprising:
a tire body having a plurality of carcass plies and a plurality of belt plies;
tire rubber vulcanized to said carcass plies and said belt plies and molded to form a plurality of spaced apart land portions having grooves extending therebetween; and
wear indicating means including a plurality of housing assemblies secured to at least one of said carcass plies and said belt plies at spaced apart locations, said housing assemblies having a base and a sidewall formed from a housing material and terminating in an open end, said sidewall extending radially outward beyond an outermost ply of said belt plies to a position beyond the base of an adjacent groove, said housing assembly containing a visually distinctive material as compared to said tire rubber and other than said housing material, and said housing assembly including an insulative material wherein, as said tread rubber wears down, said visually distinctive material is exposed to indicate tire wear.

15. A tire as defined in claim 14 wherein:
said insulative material is disposed across said open end of said housing assemblies, and
said visually distinctive material is contained within said housing assembly beneath said insulative material.

16. A tire as defined in claim 14 wherein:
said sidewall is cylindrical in shape.

17. A tire as defined in claim 16 wherein:
said base is circular in shape and has a diameter greater than that of said sidewall to form a rim for securing said housing assembly between two plies of said carcass.

18. A tire as defined in claim 14 wherein:
said housing assembly further includes an inner wall spaced from said sidewall.

19. A tire as defined in claim 18 wherein:
said insulative material is disposed between said sidewall and said inner wall.

20. A tire as defined in claim 19 wherein:
said visually material is contained within said inner wall, and
said distinctive material is isolated from said base and said open end by said insulative material.

21. A method of forming a tire having a carcass with a plurality of carcass plies and at least one belt ply and having a tread wear indicating means comprising the steps of:

securing a plurality of wear indicating assemblies to one of said carcass plies and said belt ply, said wear indicating assemblies including a visually distinctive material substantially encapsulated by a layer of insulative material and a metallic housing, said visually distinctive material being material other than the material of said metallic housing; and vulcanizing tire rubber to said carcass and simultaneously molding said tire rubber to form a plurality of land portions comprising a tread design in said tire rubber.

* * * * *